R. D. VALENTINE.
TRACTION ENGINE.
APPLICATION FILED JAN. 22, 1912.
1,070,362.
Patented Aug. 12, 1913.
4 SHEETS—SHEET 1.
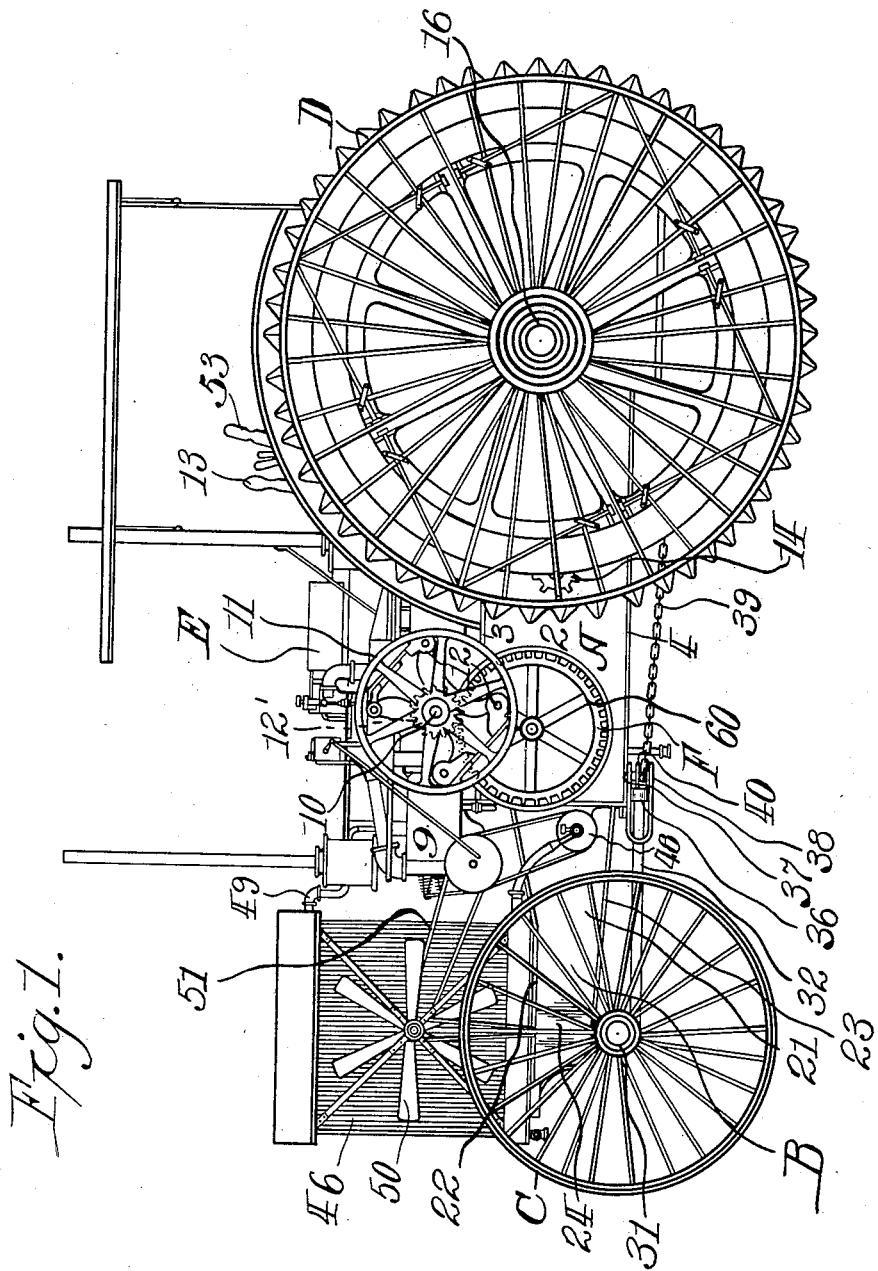

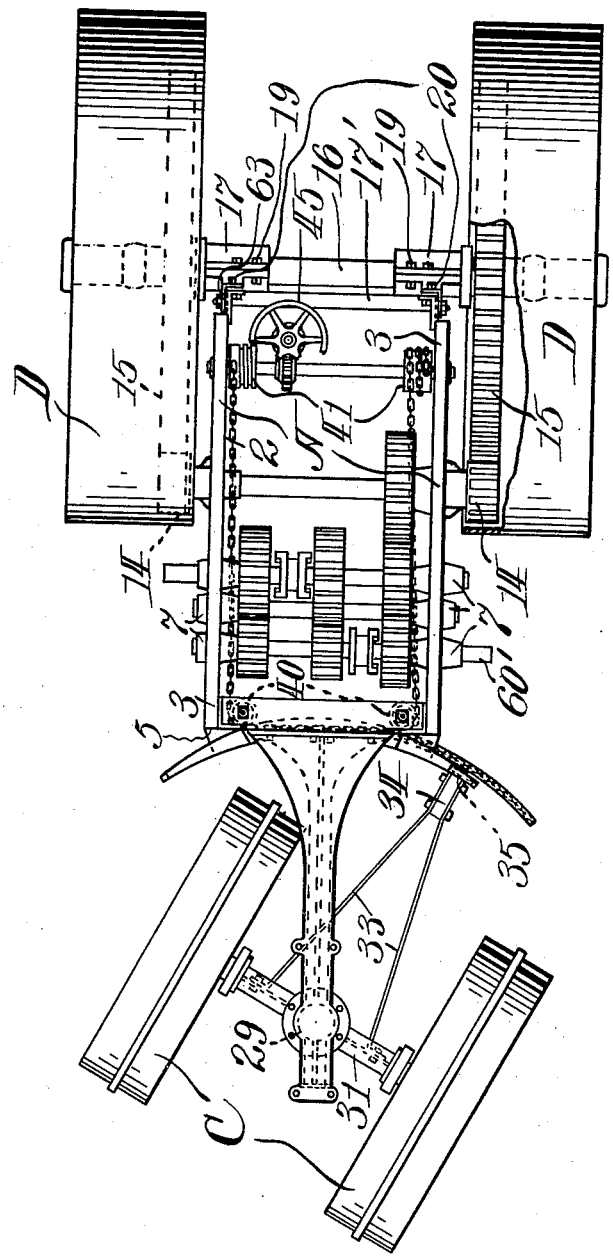

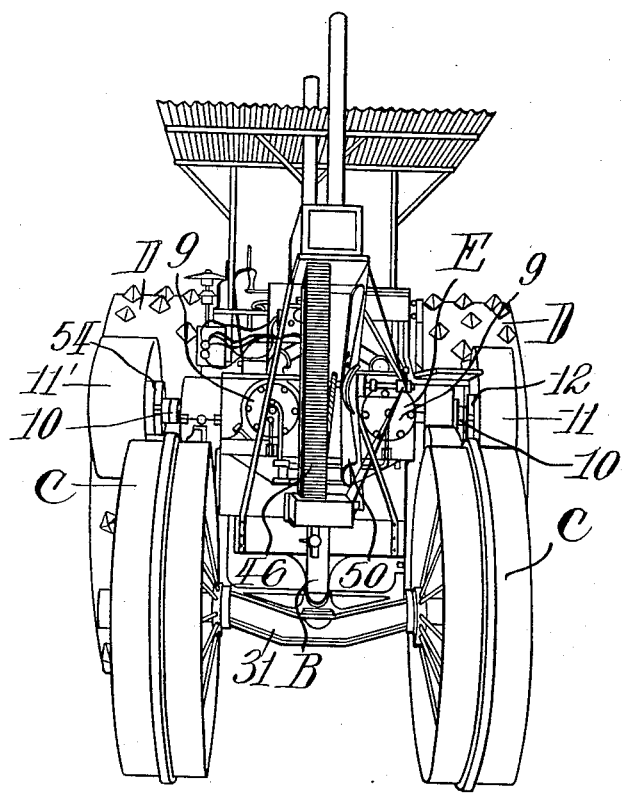

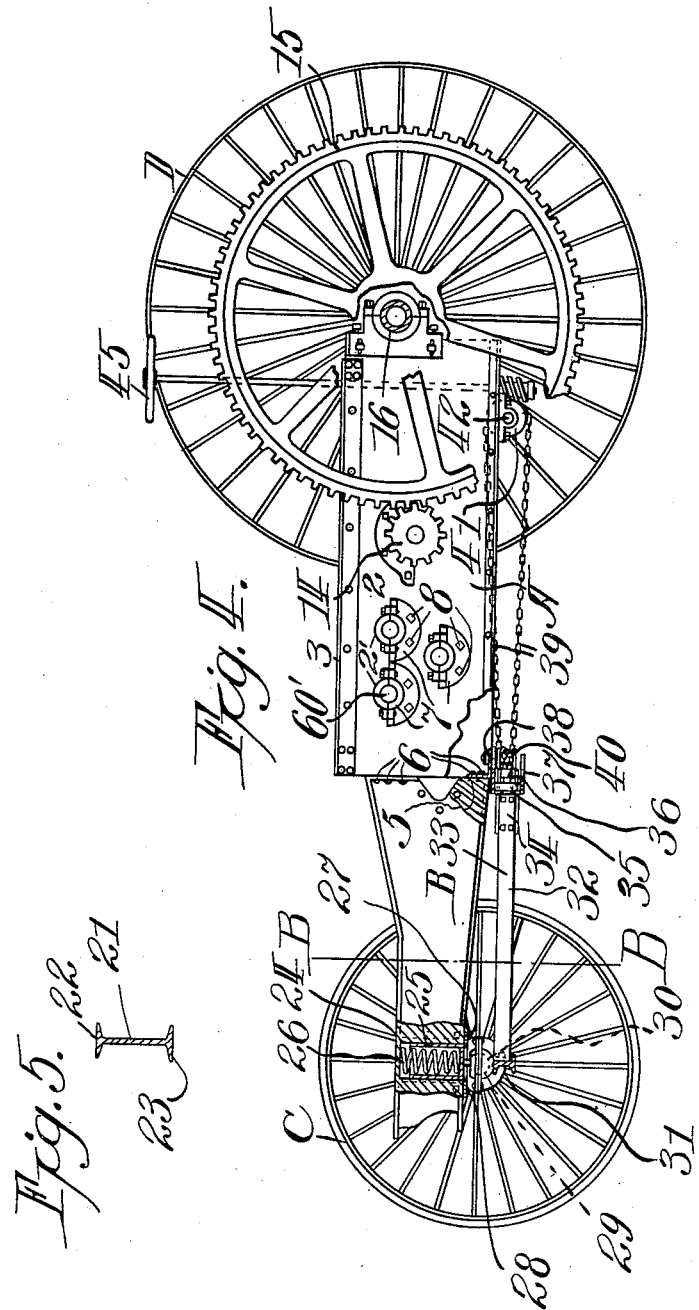

UNITED STATES PATENT OFFICE.

ROBERT D. VALENTINE, OF MINNEAPOLIS, MINNESOTA.

TRACTION-ENGINE.

1,070,362. Specification of Letters Patent. Patented Aug. 12, 1913.

Original application filed July 29, 1910, Serial No. 574,459. Divided and this application filed January 22, 1912. Serial No. 672,798.

*To all whom it may concern:*

Be it known that I, ROBERT D. VALENTINE, a citizen of the United States, residing at Minneapolis, in the county of Hennepin and State of Minnesota, have invented a new and useful Improvement in Traction-Engines, of which the following is a specification.

My invention relates to improvements in traction engines and its object is to provide a steering device for tractors particularly adapted to their use with belt drivers, and gives ease in steering. The parts of the steering head are simple in construction and give a universal action at the joint fitting the tractor to rough ground and preventing the racking of the frame.

This application is a division of my application, Serial No. 574,459, filed July 29th, 1910.

In the drawings with which I have illustrated my device and which form part of my specification, Figure 1 is a side elevation of my engine complete; Fig. 2 is a plan view with the engine cylinders removed showing the driving gears and steering apparatus; Fig. 3 is a front elevation; Fig. 4 is a side elevation of the running gear and framework, partially in section, and Fig. 5 is a section on the line B—B, Fig. 4.

My traction engine as illustrated in the accompanying drawing, consists of a box-like body A having inclosed lateral sides and front end and a forwardly extending reach B. The forward end of reach B is mounted upon the steering wheels C while the rear end of the body A is supported by the axle of the drive-wheels D.

On the top of the body A is mounted a gasolene engine E which operates the drive wheels D through a series of transmission gears F.

The body A is made up of steel side plates 2 stiffened at the top and bottom by flanges 3 and 4. Across the front of the body A, an angle plate 5 is connected to the reach B by rivets 6. In the steel side plates 2 are openings 2' into which bearing boxes 7 are fitted and attached to the sides 2 by bolts 8, said boxes thus being reversible and interchangeable. These boxes serve to support the shafts of the transmission gears F, the strains being carried by the sides 2 and the bolts 8 merely serving to hold the boxes in place.

The engine E is made up of cylinders 9 lying longitudinally of the tractor and has a crank shaft 10 lying transversely and carrying the fly wheel 11 on one end and loose pulley 11' on the other. Within the flange of the fly wheel 11 is an ordinary hand operated friction clutch 12 which is operated by lever 13 in the cab of the tractor. Secured to the friction clutch 12 is a gear 12' meshing with gear 60 of the transmission gears F. Thus when the clutch 12 is thrown into engagement with the fly wheel 11, the gear 12' will drive the gear 60 and through the transmission gears F, which are of ordinary construction, drive the bull pinions 14. These pinions 14 mesh with the bull gears 15 which are mounted upon the drive wheels D. The loose pulley 11' on the crank shaft 10 is operated by a hand lever 53 and friction clutch 54 of ordinary construction, its operation being independent of the transmission gears F and other parts, thus allowing the use of the pulley 11' as an additional fly wheel or to be used as a belt driving pulley without operating more than the engine, making a very desirable feature not found in other machines of this nature.

Drive wheels D carrying the bull gears 15 are mounted on an axle 16 which is journaled in adjustable bearings 17 being secured by bolts 19 to an angle plate 17' which extends across the rear portion of the body A. The angle plate 17' has projecting gibs 63 against which the bases of the journal boxes 17 rest and assist in carrying the downward thrust on the body A.

The reach B is in the shape of an I beam with a vertical web portion 21 and top and bottom flanges 22 and 23, as shown in Fig. 5. The flanges 22 and 23 are increased in width to stiffen the tractor laterally. Near the front end of the reach B, a vertical recess 24 is formed which is fitted to receive a cup 25 having a coiled spring 26 within it supporting the reach B. A stop plate 27 fastened to the reach by suitable bolts 28 retains the cup 25 within the recess 24. Integral with the cup 25 and extending through the stop plate 27 is a ball pivot 29 which rests in the recesses 30 in the axle 31 of the steering wheels C thus forming a ball and socket joint adapted to allow universal motion between the steering wheels and the tractor body and the spring 26, eliminating the usual jar on the frame and other parts.

Attached to the axle of the steering wheels C is the tiller 32 formed of two bars 33 uniting in a steering head 34 which carries an antifriction wheel 35 and a quadrant 36 moving between the guide pieces 37 and 38 attached to the body A. Steering chains 39 are attached to the opposite ends of the quadrant 36 and pass around sheave wheels 40 mounted on the body A. The chains 39 are crossed between the attachments of the quadrant and the sheave around which they pass permitting the turning of the steering wheels through a large arc. From the sheave wheels the chains 39 pass to winding drums 41 on which the chains are wound in opposite directions so that the rotation of the drums unwinds one chain at the same time that it winds in the other. The drums 41 are mounted on a shaft 42 which is operated by worm gears connected with the hand wheel 45.

Above the forward portion of the reach B is mounted the radiator 46 consisting of a series of vertical pipes having a water connection with the engine through a pump 48 and a return pipe 49. The cooling of the pipes is assisted by the fan 50 driven by the belt 51 upon the engine E.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. In a traction engine, a body frame having a forwardly extending reach, a front axle pivotally mounted upon said reach to move universally, a tiller extending rearwardly from said axle having an arched head, an antifriction wheel journaled upon said head and adapted to turn substantially in alinement with the travel thereof, chains crossed and connected to the opposite ends of said head and also extending rearwardly, sheaves mounted upon said frame and over which said chains are adapted to run, drums around which rearward ends of said chains are adapted to respectively wind and unwind simultaneously, a shaft journaled upon said frame and carrying said drums, a steering wheel, and a worm gear connection between said steering wheel and the shaft carrying said drums.

2. In a traction engine, a body frame having a forwardly extending reach in the form of a girder, a front axle pivotally mounted upon said girder to move universally, a tiller extending rearwardly from said axle having a curved head, a guide in which said head is adapted to slide, chains crossed and connected to the opposite ends of said head and extending rearwardly, sheaves over which said chains run, drums around which said chains are adapted to respectively wind and unwind simultaneously, a shaft carrying said drums and a steering shaft operatively connected to said drum shaft.

In testimony whereof, I have signed my name to this specification, in the presence of two subscribing witnesses.

ROBERT D. VALENTINE.

Witnesses:
F. G. BRADBURY,
H. L. FISCHER.

---

Copies of this patent may be obtained for five cents each, by addressing the "Commissioner of Patents, Washington, D. C."